United States Patent
Iyoda et al.

(10) Patent No.: US 8,403,491 B2
(45) Date of Patent: Mar. 26, 2013

(54) OPTICAL COMBINER AND IMAGE PROJECTOR USING THE OPTICAL COMBINER

(75) Inventors: Yoshitomo Iyoda, Yokohama (JP); Akira Inoue, Yokohama (JP); Tomomi Sano, Yokohama (JP); Michiko Takushima, Yokohama (JP); Takayuki Shimazu, Yokohama (JP)

(73) Assignee: Sumitomo Electric Industries, Ltd., Osaka-shi (JP)

(*) Notice: Subject to any disclaimer, the term of this patent is extended or adjusted under 35 U.S.C. 154(b) by 236 days.

(21) Appl. No.: 12/755,986

(22) Filed: Apr. 7, 2010

(65) Prior Publication Data

US 2010/0259728 A1 Oct. 14, 2010

(30) Foreign Application Priority Data

Apr. 10, 2009 (JP) ................... 2009-095709

(51) Int. Cl.
*G03B 21/00* (2006.01)
(52) U.S. Cl. ........................................... 353/31
(58) Field of Classification Search .............. 353/31, 353/33, 37; 359/558, 566, 567, 618, 619, 359/626, 719, 741–743
See application file for complete search history.

(56) References Cited

U.S. PATENT DOCUMENTS

| | | | |
|---|---|---|---|
| 4,870,268 A * | 9/1989 | Vincent et al. ................. | 250/226 |
| 4,930,864 A | 6/1990 | Kuster et al. | |
| 5,459,611 A * | 10/1995 | Bohn et al. .................... | 359/618 |
| 5,751,492 A | 5/1998 | Meyers | |
| 5,801,889 A | 9/1998 | Meyers et al. | |
| 6,496,465 B1 * | 12/2002 | Broome et al. .......... | 369/112.08 |
| 6,648,475 B1 * | 11/2003 | Roddy et al. .................... | 353/31 |
| 7,397,616 B2 | 7/2008 | Nagai et al. | |
| 2005/0190563 A1 * | 9/2005 | Li et al. ....................... | 362/332 |
| 2007/0098324 A1 | 5/2007 | Kitamura et al. | |

(Continued)

FOREIGN PATENT DOCUMENTS

| | | |
|---|---|---|
| JP | 01-237619 | 9/1989 |
| JP | 07-077666 | 3/1995 |

(Continued)

OTHER PUBLICATIONS

Yoshitomo Iyoda et al., U.S. Appl. No. 12/756,008, "Optical Combiner and Image Projector Using the Optical Combiner", filed Apr. 7, 2010.

*Primary Examiner* — Thanh Luu
*Assistant Examiner* — Renee Naphas
(74) *Attorney, Agent, or Firm* — Venable LLP; Michael A. Sartori; Tamatane J. Aga

(57) ABSTRACT

An optical combiner in which fewer parts are used comprises an optical component and a plastic body. The component comprises: a first filter reflecting first light having a first wavelength and being transparent to second light having a second wavelength and third light having a third wavelength; a second filter reflecting second light and being transparent to third light; and a base transparent to second light and third light. The first filter and the second filter are provided on opposed surfaces of the base. The plastic body has first, second, and third surfaces, and the first surface provides first, second, and third lenses. The component is provided in the plastic body such that light from the first lens is connected to a path to the second surface through the first filter and light from the second lens is connected to the path through the second filter. The third surface is a reflecting surface for connecting light from the third lens to the path.

4 Claims, 2 Drawing Sheets

U.S. PATENT DOCUMENTS

| | | |
|---|---|---|
| 2008/0174739 A1 | 7/2008 | Iwasaki |
| 2008/0212036 A1 | 9/2008 | Hishida |
| 2008/0225361 A1 | 9/2008 | Kasazumi et al. |

FOREIGN PATENT DOCUMENTS

| | | |
|---|---|---|
| JP | 2003-066271 | 3/2003 |
| JP | 2004334082 A | 11/2004 |
| JP | 2005-114977 | 4/2005 |
| JP | 2006267457 A | 10/2006 |
| JP | 2007121899 A | 5/2007 |
| JP | 2008033042 A | 2/2008 |
| JP | 2008216456 A | 9/2008 |
| WO | WO-2005073798 A1 | 8/2005 |

* cited by examiner

OPTICAL COMBINER AND IMAGE PROJECTOR USING THE OPTICAL COMBINER

BACKGROUND OF THE INVENTION

1. Field of the Invention

The present invention relates to an optical combiner, and to an image projector in which the optical combiner is used.

2. Description of Related Art

Image projectors are described in Japanese Patent Application Publication No. 2008-033042, Japanese Patent Application Publication No. 2004-334082, International Publication No. 2005/073798, Japanese Patent Application Publication No. 2007-121899, Japanese Patent Application Publication No. 2006-267457, and Japanese Patent Application Publication No. 2008-216456. In many cases, an image projector is equipped with three light sources for RGB, lenses, a combiner and a scanning mechanism. Light emitted from the three light sources are condensed by the lenses, the combiner combines RGB rays, and the scanning mechanism scan combined light, and thereby images are displayed. A dichroic mirror, a prism, a diffraction grating device, etc. are used in the combiner. Consequently, it is difficult to downsize the image projector in which a number of parts are used.

SUMMARY OF THE INVENTION

The object of the present invention is to provide an optical combiner in which the number of parts is lessened, and also to provide an image projector in which the optical combiner is used.

To achieve the object, an optical combiner comprising an optical component and a plastic body is provided. The optical component comprises a first optical filter, a second optical filter, and a base. The first optical filter reflects light having a first wavelength, while it is transparent to light having a second wavelength and light having a third wavelength. The second optical filter reflects light having the second wavelength, while it is transparent to light having the third wavelength. The base has a first main surface and a second main surface, and is transparent to light having the second wavelength and light having the third wavelength. The first optical filter is provided on the first main surface, and the second optical filter is provided on the second main surface. The plastic body has first, second, and third surfaces, and the first surface provides first, second, and third lenses. The optical component is arranged in the plastic body such that light from the first lens is connected through the first optical filter to an optical path leading to the second surface and light from the second lens is connected to the optical path through the second optical filter. The third surface is a reflecting surface for connecting light from the third lens to the optical path.

The plastic body of the optical combiner of the present invention can be formed by integral molding of a resin. The first, second and third lenses may be a Fresnel lens.

Another embodiment of the present invention is an image projector comprising an optical combiner of the present invention, first; second, and third light sources, and a scanning mechanism. A first light source emits light having a first wavelength, a second light source emits light having a second wavelength, and a third light source emits light having a third wavelength. Light beams from the first, second, and third light sources are combined on an optical path by the optical combiner, and light thus combined is emitted from the combiner. The scanning mechanism scans light combined by the optical combiner.

The structure according to the present invention enables providing a plurality of optical elements with a fewer parts, and accordingly an optical combiner in which less number of parts are used can be provided. Also, since the optical path leading to the second surface from the first, second, and third lenses is constituted of a plastic body, the optical combiner is strong against an exterior disturbance. The image projector of the present embodiment can be downsized, because it is equipped with the above-mentioned optical combiner and the number of parts can be lessened.

DESCRIPTION OF THE PREFERRED EMBODIMENTS

Figure 1:
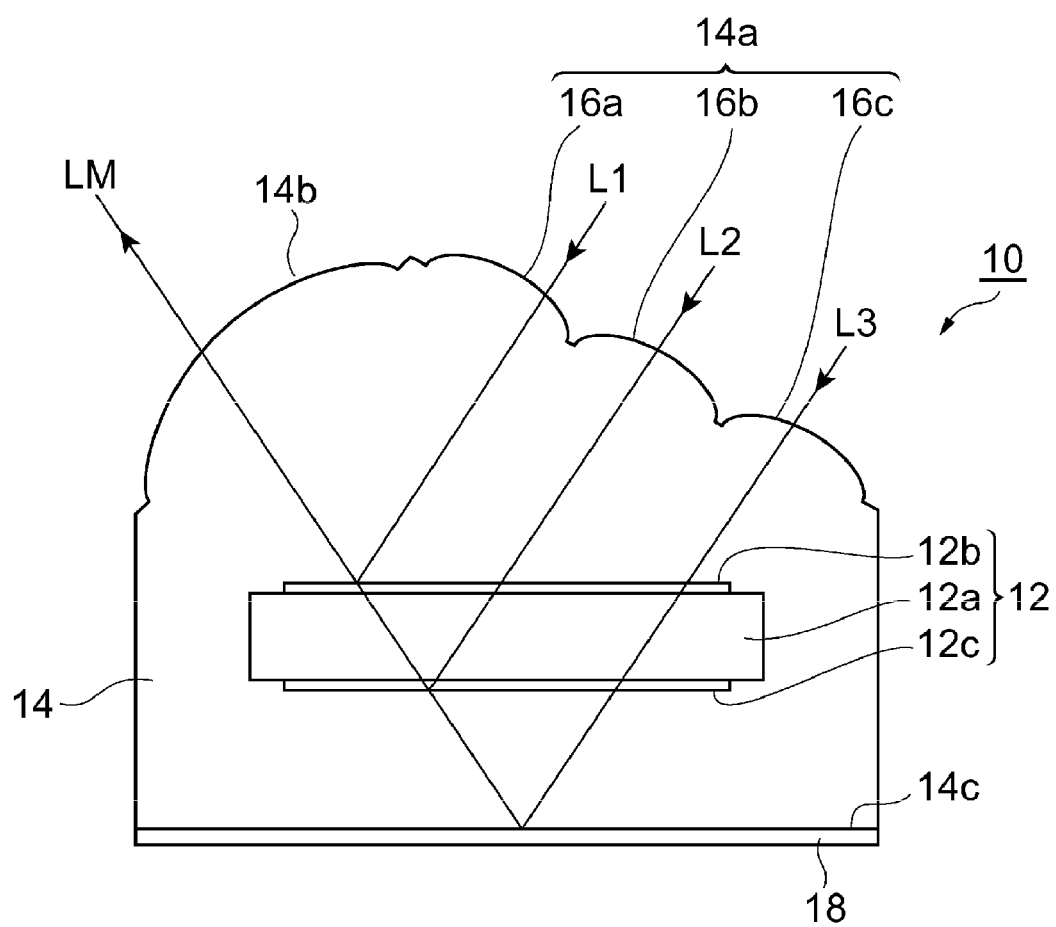
FIG. 1 is a conceptional schematic diagram showing an optical combiner relating to an embodiment of the present invention.

Hereinafter, preferred embodiments for carrying out the invention and advantages of the invention will be described in reference to the accompanying drawings. In the drawings, an identical mark represents the same element, and the repetition of its explanation is omitted.

FIG. 1, which is a conceptional schematic diagram of an optical combiner 10 relating to an embodiment of the present invention, shows its section including optical axes of light L1 having a first wavelength, light L2 having a second wavelength, light L3 having a third wavelength, and combined light LM (e.g., light L1 of first wavelength (R), light L2 of second wavelength (G), and light L3 of third wavelength (B) are light corresponding to three colors of RGB). The optical combiner 10 comprises an optical component 12 and a plastic body 14. The optical component 12 has a base 12a, a first optical filter 12b, and a second optical filter 12c.

The base 12a is composed of a material that is transparent to the light combined by the optical combiner 10. For example, the base 12a is made of glass. The first optical filter 12b is provided on one of the main surfaces of the base 12a, and the second optical filter 12c is provided on the other main surface.

The first optical filter 12b reflects light L1 of first wavelength, and is transparent to light L2 of second wavelength and light L3 of third wavelength. The second optical filter 12c reflects the light L2 of second wavelength, and is transparent to the light L3 of the third wavelength. The first optical filter 12b and the second optical filter 12c can be constituted of a dielectric multi-layer film, for example.

The plastic body 14 has the optical component 12 embedded therein so that the light L1 of first wavelength that is incident on the plastic body 14 may be combined to the optical path of the combined light LM as a result of reflection caused by the first optical filter, and the light L2 of second wavelength that is incident on the plastic body 14 may be combined to the optical path of the combined light LM as a result of reflection caused by the second optical filter.

The plastic body 14 includes a first surface 14a, a second surface 14b, and a third surface 14c. The first surface 14a is a surface on which the light L1 of first wavelength, light L2 of second wavelength, and light L3 of third wavelength are incident. The second surface 14b is a surface from which the light LM combined by the optical combiner 10 is emitted. The third surface 14c is a surface at which the light L3 of third wavelength is reflected to combine with the optical path of the combined light LM.

The first surface 14a provides a first lens 16a, a second lens 16b, and a third lens 16c. The first lens 16a is a lens for condensing light L1 of first wavelength. The second lens 16b is a lens for condensing light L2 of second wavelength. The third lens 16c is a lens for condensing light L3 of third wavelength. The second surface 14b may be planar, or may be a surface that constitutes a lens as shown in FIG. 1. The third surface 14c is a reflecting surface which may be processed by coating a reflection film 18, for example. The reflection film may be a film made of aluminum or gold.

The plastic body 14 can be formed by integral molding of cyclic olefin polymer or polycarbonate, for example. The optical combiner 10 can be manufactured by previously putting the optical component 12 in a mold and then injection molding a resin.

Figure 2:
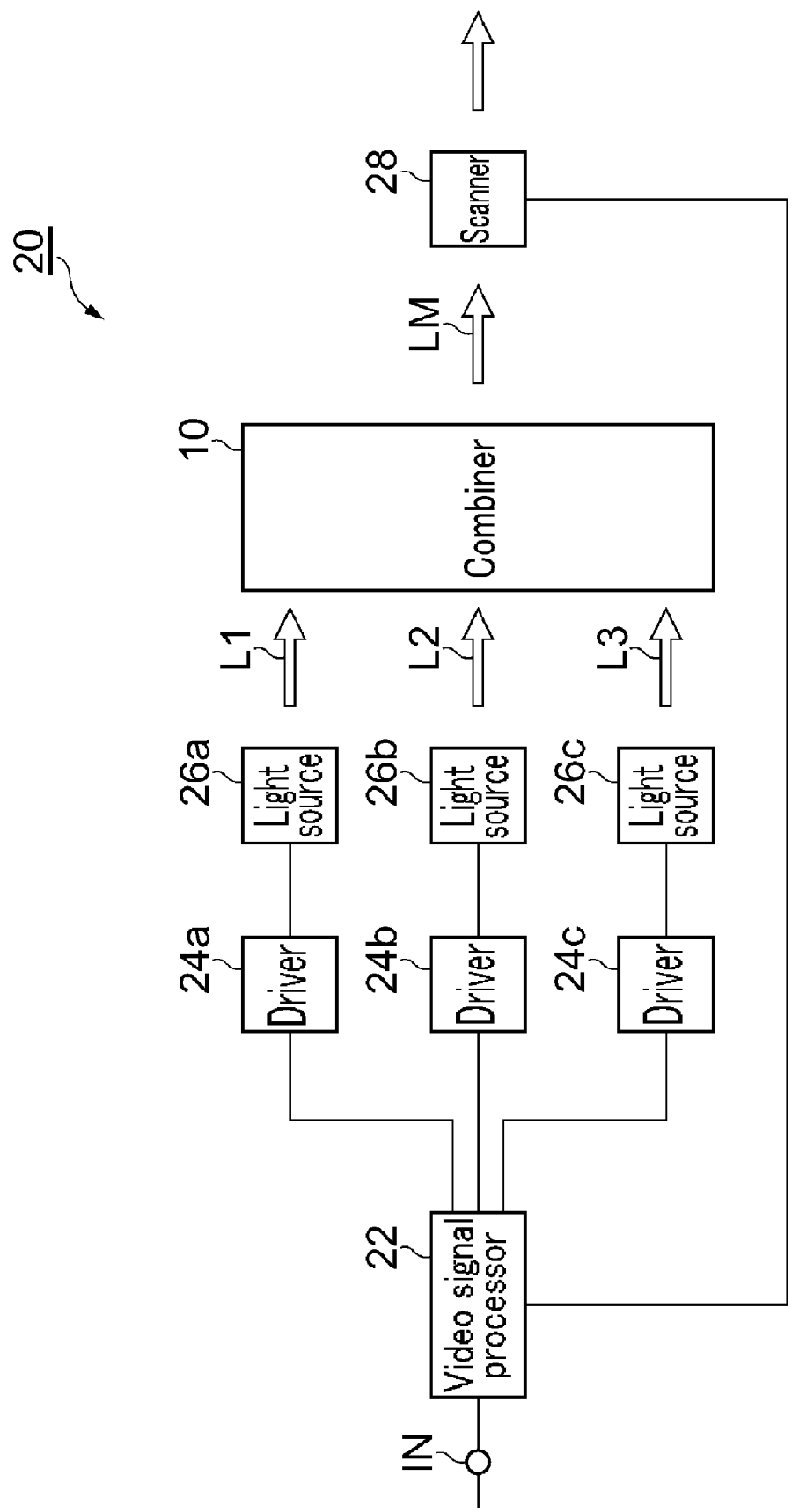
FIG. 2 is a conceptional schematic diagram showing an image projector relating to an embodiment of the present invention.

FIG. 2 is a conceptional schematic diagram showing an image projector 20 relating to an embodiment of the present invention. The image projector 20 comprises a video signal processing unit 22, drivers 24a to 24c, light sources 26a to 26c, an optical combiner 10, and a scanning mechanism (scanner) 28.

The video signal processing unit 22 receives video signals input into the input terminal IN, and forms the respective RGB signals. The video signal input into the video signal processing unit 22 is a composite video signal, for example. The video signal processing unit 22 is connected to drivers 24a to 24c, electrical signals are output to them according to the strength of the respective RGB signals thus formed.

The driver 24a is a circuit for modulating the light source 26a so as to emit light for the first wavelength (R). The driver 24b is a circuit for modulating a light source 26b so as to emit light for the second wavelength (G). The driver 24c is a circuit for modulating the light source 26c so as to emit light for the third wavelength (B). The drivers 24a to 24c are connected with the light sources 26a to 26c, and output modulation signals to the light sources 26a to 26c, respectively.

The light sources 26a to 26c are a laser diode, for example. The light source 26a emits light having a first wavelength at strength according to the modulation signal from the driver 24a. The light source 26b emits light having a second wavelength at a strength according to the modulation signal from the driver 24b. The light source 26c emits light having a third wavelength at a strength according to the modulation signal from the driver 24c.

The light sources 26a to 26c are optically connected to the optical combiner 10. Light beams from the light sources 26a to 26c are combined by the combiner 10, and are emitted as combined light LM from the combiner 10. The combiner 10 is optically connected to the scanner 28.

The scanner 28 scans light emitted from the combiner 10 and displays images on the projection surface. The scanner 28 can be constituted of a galvanic minor for horizontal scanning and a galvanic mirror for vertical scanning, for example.

Hereinafter, the function and effect of the combiner 10 and the image projector 20 will be explained. The combiner 10 has the optical component 12 embedded in the plastic body 14 such that light beams of three different wavelengths is combined. Therefore, the combiner 10 allows reduction in the number of parts. Also, it is easy to make positional adjustment of optical elements (the first, second, and third lenses, each optical filter, and a reflecting surface (the third surface)) in the combiner 10, since the combiner 10 can be formed by plastic molding, previously attaching the optical component 12 inside a mold. Moreover, the combiner 10 is strong against an exterior disturbance, since the optical path through which light of each wavelength passes and the optical path through which the combined light passes are constituted of a resin. The image projector 20 in which such a combiner 10 as described above is used can be downsized and is strong against an exterior disturbance.

In the above, the invention is described based on practical and preferable embodiments; however, the invention should not be limited to the embodiments, and various modifications are possible within the scope of the invention. For example, the first to third lenses may be Fresnel lenses. In such case, the thickness of the first to third lenses can be made thinner. Also, the first to third lenses may be gradient index lenses. The image projector of the present invention is not limited to one in which the light source is modulated. For example, light that is emitted from a light source at constant strength may be modulated by a modulator according to video signals of RGB.

What is claimed is:

1. An optical combiner comprising an optical component and a plastic body,
    the optical component comprising a first optical filter, a second optical filter, and a base, the first optical filter reflecting light having a first wavelength and being transparent to light having a second wavelength and light having a third wavelength, the second optical filter reflecting light having the second wavelength and being transparent to light having the third wavelength, the base having a first main surface and a second main surface, the base being transparent to light having the second wavelength and light having the third wavelength, the first optical filter being provided on the first main surface, the second optical filter being provided on the second main surface,
    the plastic body having first, second, and third surfaces, the first surface providing first, second, and third lenses,
    the optical component is surrounded by the plastic body in section including optical axes of
    light L1 having a first wavelength,
    light L2 having a second wavelength,
    light L3 having a third wavelength, and
    combined light LM,
    such that light from the first lens is connected to an optical path to the second surface through the first optical filter, light from the second lens is connected to the optical path through the second optical filter, and the third surface is a reflecting surface for connecting light from the third lens to the optical path, the reflecting surface having a reflection film consisting of aluminum or gold, and
    the optical path between the second optical filter and the third surface and the first, second, and third lenses are formed with the plastic body.

2. An optical combiner according to claim 1, wherein the plastic body is formed by integral molding of a resin.

3. An optical combiner according to claim 1, wherein the first to third lenses are Fresnel lenses.

4. An image projector comprising:
    a first light source for emitting light having a first wavelength;
    a second light source for emitting light having a second wavelength;
    a third light source for emitting light having a third wavelength;
    an optical combiner according to claim 1, the optical combiner combining light from the first light source, light from the second light source, and light from the third light source so as to emit the combined light on the optical path; and
    a scanning mechanism for scanning light combined by the optical combiner.

* * * * *